United States Patent
Mimura et al.

(10) Patent No.: US 7,630,460 B2
(45) Date of Patent: Dec. 8, 2009

(54) IMPULSE RADIO COMMUNICATION DEVICE

(75) Inventors: Masahiro Mimura, Tokyo (JP); Kazuaki Takahashi, Tokyo (JP); Suguru Fujita, Tokyo (JP); Yoshinori Kunieda, Tokyo (JP); Noriyuki Ueki, Tokyo (JP)

(73) Assignee: Panasonic Corp., Osaka (JP)

( * ) Notice: Subject to any disclaimer, the term of this patent is extended or adjusted under 35 U.S.C. 154(b) by 303 days.

(21) Appl. No.: 11/569,133

(22) PCT Filed: Mar. 8, 2006

(86) PCT No.: PCT/JP2006/304444

§ 371 (c)(1),
(2), (4) Date: Nov. 15, 2006

(87) PCT Pub. No.: WO2006/112193

PCT Pub. Date: Oct. 26, 2006

(65) Prior Publication Data

US 2008/0267324 A1   Oct. 30, 2008

(30) Foreign Application Priority Data

Mar. 31, 2005 (JP) .............................. 2005-102205
Feb. 14, 2006 (JP) .............................. 2006-036319

(51) Int. Cl.
*H04L 27/06* (2006.01)
(52) U.S. Cl. ................. 375/340; 375/343; 375/316; 375/147; 375/140; 375/150
(58) Field of Classification Search ............. 375/343, 375/340, 316, 147, 140, 150, 149, 368
See application file for complete search history.

(56) References Cited

U.S. PATENT DOCUMENTS 5,598,221 A * 1/1997 Miyahara et al. ............ 348/554
6,188,654 B1 * 2/2001 Kaku et al. .............. 369/47.27

(Continued)

FOREIGN PATENT DOCUMENTS

JP    2003-535552 A    11/2003

(Continued)

OTHER PUBLICATIONS

International Search Report for Application PCT/JP2006/304444, dated May 30, 2006.

*Primary Examiner*—Shuwang Liu
*Assistant Examiner*—Kenneth Lam
(74) *Attorney, Agent, or Firm*—RatnerPrestia

(57) ABSTRACT

An impulse radio communication device includes a wave detector for generating a detected signal, a switching section for selecting either a received signal or the detected signal in accordance with an external control signal and outputting it as a demodulation target signal, a reference waveform generating section synchronized with the demodulation target signal and generating a reference waveform signal having a different waveform in accordance with the external control signal, a demodulator for generating a demodulated signal from the demodulation target signal in accordance with the reference waveform signal, and a decoding section for decoding received data from the demodulated signal. This impulse radio communication device switches the demodulation target signal and the reference waveform signal simultaneously in accordance with a receiving and synchronizing state. This makes it difficult that synchronization is pulled in a correlation position having low electric power, and can reduce a acquisition time.

18 Claims, 11 Drawing Sheets

U.S. PATENT DOCUMENTS

| | | | |
|---|---|---|---|
| 2003/0063025 A1* | 4/2003 | Low et al. | 341/157 |
| 2003/0108133 A1* | 6/2003 | Richards | 375/351 |
| 2003/0161411 A1* | 8/2003 | McCorkle et al. | 375/295 |
| 2005/0025006 A1* | 2/2005 | Hirayama et al. | 369/47.22 |
| 2005/0100079 A1* | 5/2005 | Sanada et al. | 375/141 |
| 2005/0162338 A1* | 7/2005 | Ikeda et al. | 345/2.1 |

FOREIGN PATENT DOCUMENTS

| | | |
|---|---|---|
| JP | 2004-096469 A | 3/2004 |
| JP | 2004-309896 | 10/2004 |
| JP | 2006-121609 A | 5/2006 |
| WO | WO 01/93441 A1 | 12/2001 |

* cited by examiner

IMPULSE RADIO COMMUNICATION DEVICE

THIS APPLICATION IS A U.S. NATIONAL PHASE APPLICATION OF PCT INTERNATIONAL APPLICATION PCT/JP2006/304444.

TECHNICAL FIELD

The present invention relates to an impulse radio communication device for receiving and synchronizing a pulsed modulation signal in UWB (Ultra Wide Band) and the like.

BACKGROUND ART

Japanese Translation of PCT Publication No. 2003-535552 discloses a method of synchronizing a received pulse signal in an impulse radio communication device by tracking synchronization based on a correlation between the reference time and signals that are delayed and advanced with respect to the reference time.

FIG. 18 is a block diagram showing a configuration of a conventional impulse radio communication device. Conventional impulse radio communication device 1000 includes amplifier 1002 for amplifying an RF signal received by antenna 1001, filter 1003 for removing an unwanted signal, analog coding section 1004 for converting a signal to an analog signal, splitters 1005 and 1015 for splitting a signal, a plurality of delay devices 1006, 1007 and 1008 for delaying a signal, multipliers 1009, 1010 and 1011 for multiplying signals, integrators 1012, 1013 and 1014 for time-integrating a signal, reception and synchronization control section 1017 for carrying out synchronization determination and delay control in accordance with a correlation, phase delay section 1018 for delaying a phase of a signal, and main receive wavelet code generator 1016 for modulating a phase delay signal and spreading it by the same spreading code.

In impulse radio communication device 1000, amplifier 1002 amplifies a received RF signal to the amplitude necessary for demodulation, filter 1003 removes an out-of-band unwanted frequency band, and analog coding section 1004 generates an analog code. Next, splitter 1005 splits this analog code signal, and delay devices 1006, 1007 and 1008 output three delayed signals, that is, a signal delayed by time L, a signal delayed by time L+Y, and a signal delayed by time L−Y. Then, multipliers 1009, 1010 and 1011 multiply a reference pulse signal generated in main receive wavelet code generator 1016 by the above-mentioned three delayed signals respectively, and integrators 1012, 1013 and 1014 carries out time-integration corresponding to each symbol.

Furthermore, in conventional impulse radio communication device 1000, reception and synchronization control section 1017 determines synchronization in accordance with the correlation of signals and generates decoded data 1019 while controlling phase delay section 1018 to carry out sliding synchronization. At this time, in the case where section 1017 determines that the signal delayed by time L+Y has a higher correlation than the signal delayed by time L when a received path signal with time L is defined as a reference of the correlation, section 1017 controls phase delay section 1018 so as to delay a tracking period. On the contrary, when section 1017 determines that the signal delayed by time L−Y has a higher correlation, section 1017 controls phase delay section 1018 so as to advance the tracking period. Thus, section 1017 carries out adjustment so that synchronization with a transmission symbol rate is obtained.

Thus, a conventional impulse radio communication device receives a modulated signal code-spread by a CDMA (Code Division Multiple Access) method, compares the correlation between a signal delayed with respect to a received path signal and the reference pulse with the correlation between a signal advanced with respect to a received path signal and the reference pulse, and carries out tracking of synchronization from a signal after dispreading in the CDMA.

The above-mentioned conventional impulse radio communication device determines synchronization by comparing time correlation values in a wavelet form. Therefore, when a plurality of correlation positions exist due to multipath, synchronization circuit holds a wrong a correlation position having low electric power.

Furthermore, a conventional impulse radio communication device determines the establishment of synchronization by the same determination waveform as the time when synchronization is maintained after it is established even when a phase change is large as right after receiving is started. Therefore, it takes a long time to carry out acquisition.

SUMMARY OF THE INVENTION

An impulse radio communication device of the present invention includes a wave detector for envelope-detecting a received signal and generating a detected signal, a switching section for selecting either the received signal or the detected signal in accordance with an external control signal and outputting the selected signal as a demodulation target signal, a reference waveform generating section synchronized with a phase timing of the demodulation target signal and generating a reference waveform signal having a different waveform in accordance with the external control signal, a demodulator for receiving input of the demodulation target signal and generating a demodulated signal in accordance with the reference waveform signal, and a decoding section for receiving input of the demodulated signal and decoding received data from the received signal. The demodulation target signal and the reference waveform signal are switched simultaneously in accordance with a receiving and synchronizing state.

In this impulse radio communication device, reference waveform signal having different waveform in accordance with an external control signal is generated and data are demodulated. At this time, synchronization positions are averaged by making the width of the waveform of the reference waveform signal wider than that of a received signal at the time of acquisition.

After synchronization is acquired, the waveform of the reference waveform signal is switched to a waveform similar to that of the received signal. Therefore, in the impulse radio communication device of the present invention, synchronization can be prevented from being pulled in a wrong position such as a correlation position having low electric power even when a plurality of correlation positions exist due to multipath.

Figure 1:
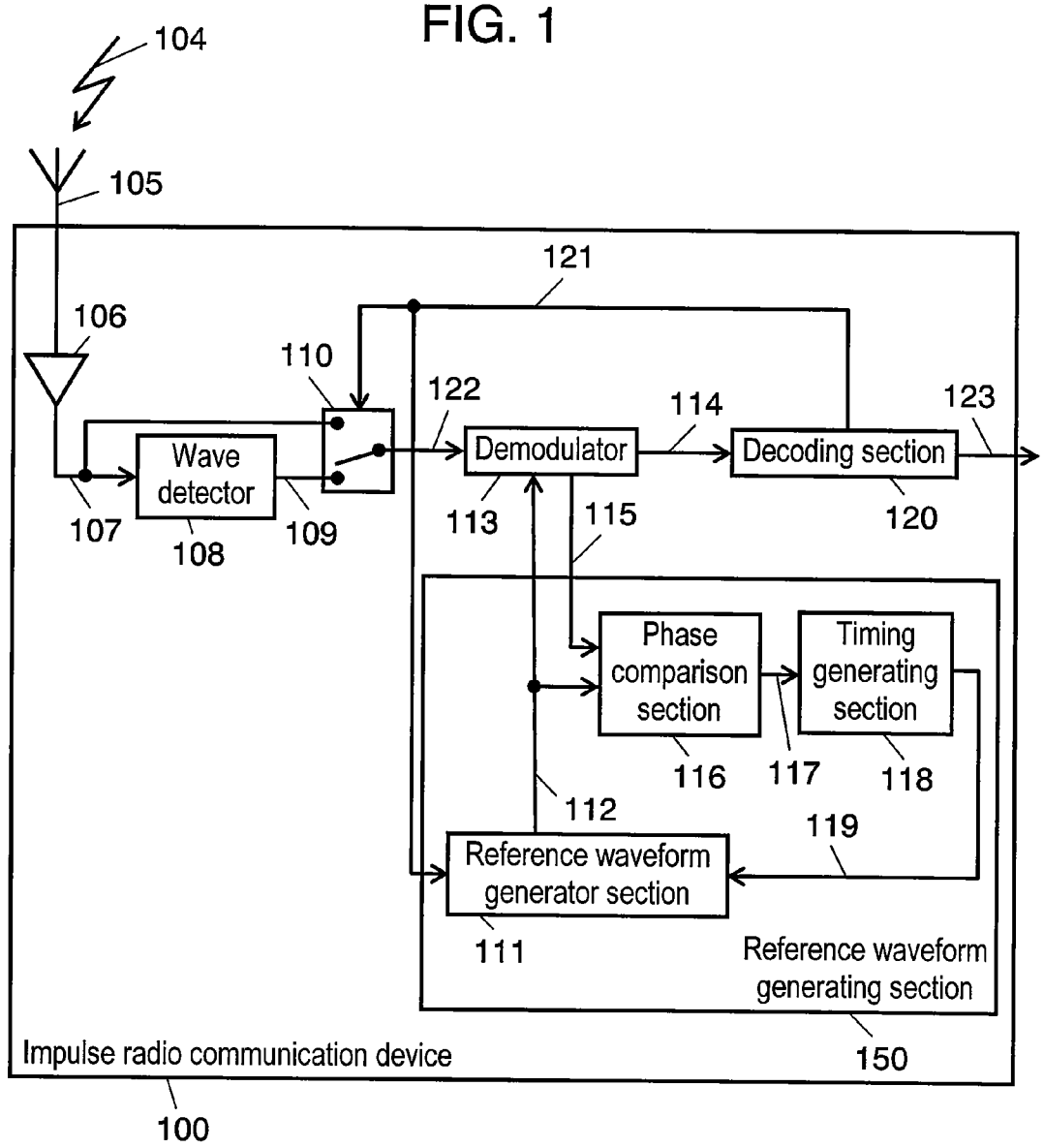
FIG. 1 is a block diagram showing a configuration of an impulse radio communication device in accordance with a first exemplary embodiment of the present invention.

REFERENCE MARKS IN THE DRAWINGS 100, 200, 201 impulse radio communication device
104 radio signal
105 receiving antenna
106 amplifier
107 received signal
108, 131 wave detector
109 detected signal
110 switching section
111 reference waveform generator section
112, 162 reference waveform signal
113, 133, 134, 161, 176 demodulator
114 demodulated signal
115 symbol clock reference signal
116, 136 phase comparison section
117 phase difference signal
118 timing generating section
119 synchronization timing signal
120 decoding section
121, 165, 175 synchronization mode signal
122 demodulation target signal
123 received data
150, 160, 170 reference waveform generation section
171 first reference waveform generation section
172 second reference waveform generation section
173 first reference waveform signal
174 second reference waveform signal
501 first waveform generating section
502 second waveform generating section
503 phase shift section
504 switch
505 mixer
551 first waveform generating circuit section
552 second waveform generating circuit section
553 combiner section
701 square circuit
702 full wave rectifier
703 signal control section
704 control signal
705 reference time signal
706, 707, 708, 734, 735, 738 delay element
716, 717, 718, 731 exclusive-OR element
721 voltage adding element
722, 723 amplifier
730 inclusive-OR element
732 first control signal
733 second control signal
736 amplifier
751 multi-stage delayed pulse signal generating circuit
752 source signal generating circuit
753 envelope defining signal generating circuit
754 combiner

DETAILED DESCRIPTION OF THE PREFERRED EMBODIMENTS

First Exemplary Embodiment

Hereinafter, an impulse radio communication device in accordance with the exemplary embodiments of the present invention is described with reference to the accompanying drawings. In a conventional impulse radio communication device, a same correlation pulse waveform is used for acquiring a synchronization position (acquisition) and maintaining a synchronization state (tracking).

On the contrary, the impulse radio communication device of this exemplary embodiment uses a wide pulse waveform for acquiring a synchronization position so as to reduce the acquisition time and uses a narrow pulse waveform for tracking so as to enhance the synchronization precision.

The configuration of the impulse radio communication device of this exemplary embodiment is described.

FIG. 1 is a block diagram showing a configuration of an impulse radio communication device in accordance with the first exemplary embodiment of the present invention. In FIG. 1, impulse radio communication device 100 is coupled to receiving antenna 105 for receiving radio signal 104 and includes amplifier 106, wave detector 108, switching section 110, demodulator 113, decoding section 120, and reference waveform generating section 150. Furthermore, reference waveform generating section 150 includes phase comparison section 116, timing generating section 118 and reference waveform generator section 111.

Amplifier 106 is configured to amplify an RF signal supplied from receiving antenna 105 to the amplitude necessary for a receiving process and to output received signal 107.

Wave detector 108 is configured to receive input of received signal 107 and carry out envelope detection so as to output detected signal 109.

Figure 2:
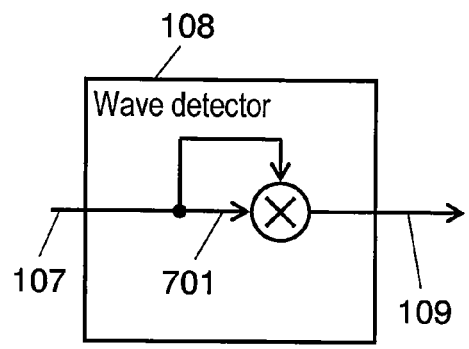
FIG. 2 is a block diagram showing a configuration example of a wave detector in accordance with the first exemplary embodiment of the present invention.

FIG. 2 is a block diagram showing a configuration example of a wave detector of the impulse radio communication device in accordance with the first exemplary embodiment of the present invention. In FIG. 2, wave detector 108 squared-detects received signal 107 by using square circuit 701 and outputs the signal as detected signal 109.

Figure 3:
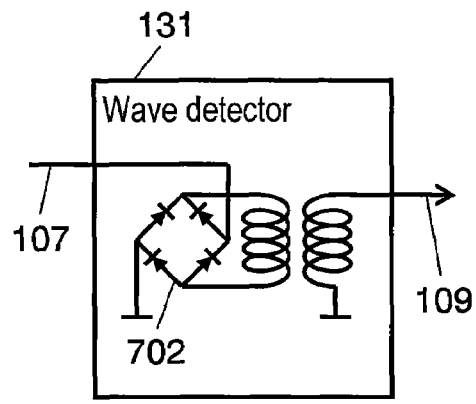
FIG. 3 is a block diagram showing another configuration example of a wave detector in accordance with the first exemplary embodiment of the present invention.

FIG. 3 is a block diagram showing another configuration example of a wave detector of the impulse radio communication device in accordance with the first exemplary embodiment of the present invention. In FIG. 3, wave detector 131 rectifies received signal 107 by using full wave rectifier 702 and outputs the signal as detected signal 109.

Switching section 110 is configured to select any one of received signal 107 and detected signal 109 in accordance with input synchronization mode signal 121 and output the selected signal as demodulation target signal 122. Herein, synchronization mode signal 121 is a signal showing any one of a "acquisition" mode that is a state in which synchronization has not been acquired and a "tracking" mode that is a state in which synchronization has already been acquired and maintained.

Reference waveform generator section 111 is configured to generate reference waveform signal 112 in the timing of synchronization timing signal 119 in accordance with input synchronization mode signal 121. Reference waveform signal 112 outputs a signal waveform with a wide pulse width suitable for acquisition in the "acquisition" mode, and outputs a signal waveform with a narrow pulse width suitable for highly precise synchronization after the acquisition of synchronization in the "tracking" mode.

Figure 4:
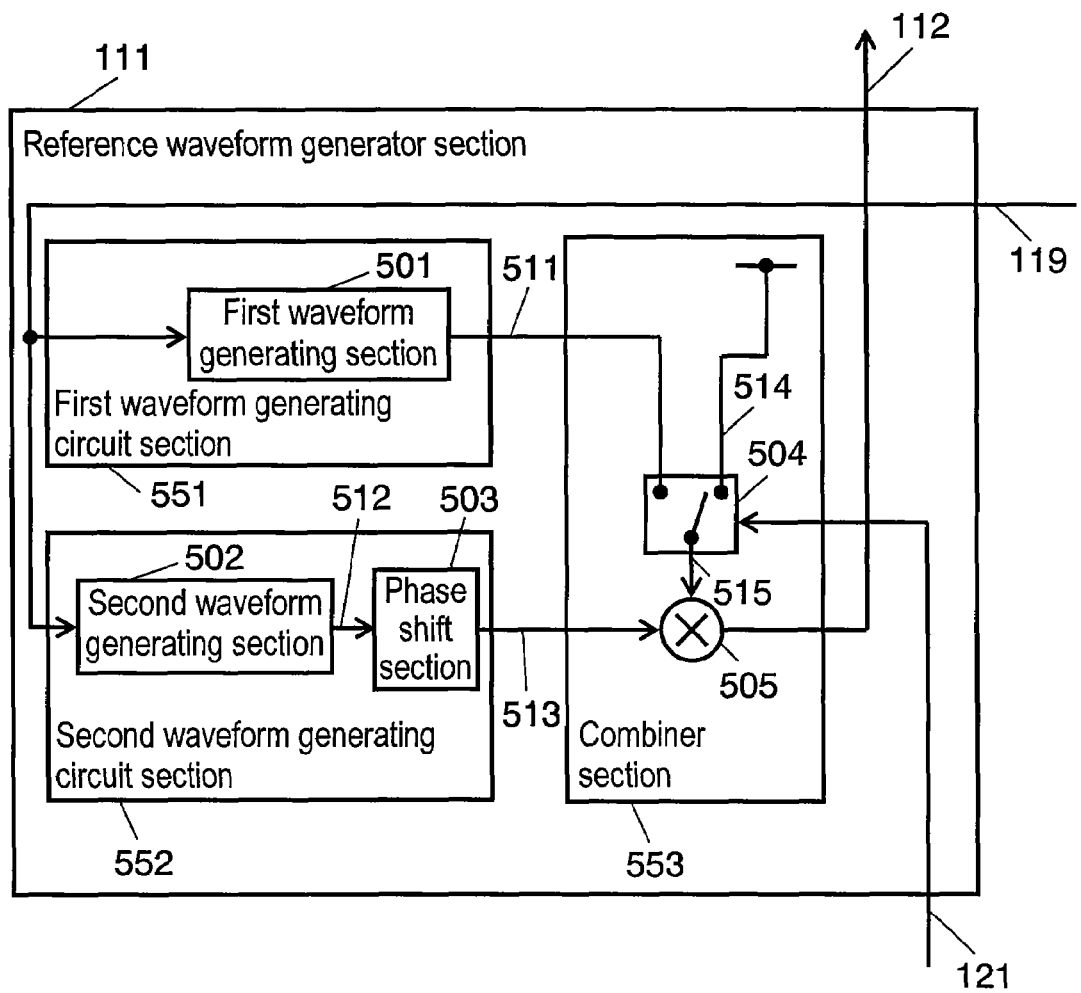
FIG. 4 is a block diagram showing a configuration of a reference waveform generating section in accordance with the first exemplary embodiment of the present invention.

FIG. 4 is a block diagram showing a configuration of a reference waveform generator section of the impulse radio communication device in accordance with the first exemplary embodiment of the present invention. In FIG. 4, reference waveform generator section 111 includes first waveform generating circuit section 551, second waveform generating circuit section 552 and combiner section 553. First waveform generating circuit section 551 includes first waveform generating section 501 for generating first waveform signal 511, that is, a waveform signal showing an amplitude component of reference waveform signal 112 from synchronization timing signal 119. Second waveform generating circuit section 552 includes second waveform generating section 502 for generating waveform signal 512 showing a frequency component waveform of reference waveform signal 112 and phase shift section 503 for changing the phase of waveform signal 512 showing a frequency component waveform of reference waveform signal 112 and outputting second waveform signal 513. Combiner section 553 includes switch 504 for outputting any one of first waveform signal 511 and signal 514 having a constant voltage value in accordance with synchronization mode signal 121, and mixer 505 for synthesizing by multiplying signal 515 output from switch 504 and second waveform signal 513 so as to output reference waveform signal 112.

Demodulator 113 is configured to generate and output demodulated signal 114 from the correlation between demodulation target signal 122 and reference waveform signal 112 and to output symbol clock reference signal 115 of the below mentioned demodulation target signal 122.

Figure 5:
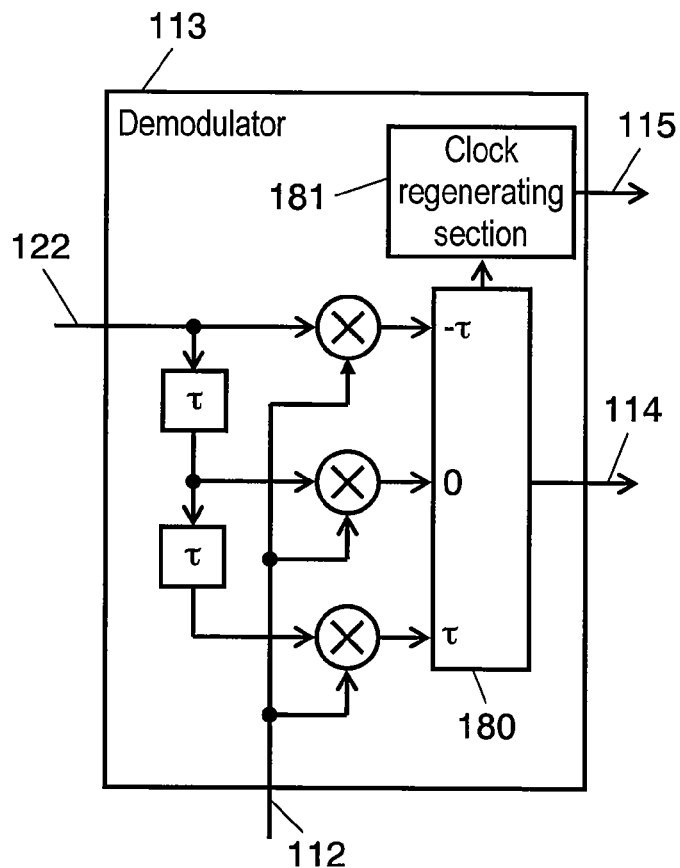
FIG. 5 is a block diagram showing a configuration example of a demodulator in accordance with the first exemplary embodiment of the present invention.

FIG. 5 is a block diagram showing a configuration example of a demodulator of the impulse radio communication device in accordance with the first exemplary embodiment of the present invention. In FIG. 5, phase determination section 180 of demodulator 113 carries out phase determination in accordance with signal 122 in a Pulse Phase Modulation (PPM) method and generates demodulated signal 114. Furthermore, clock regenerating section 181 regenerates symbol clock reference signal 115.

Figure 6:
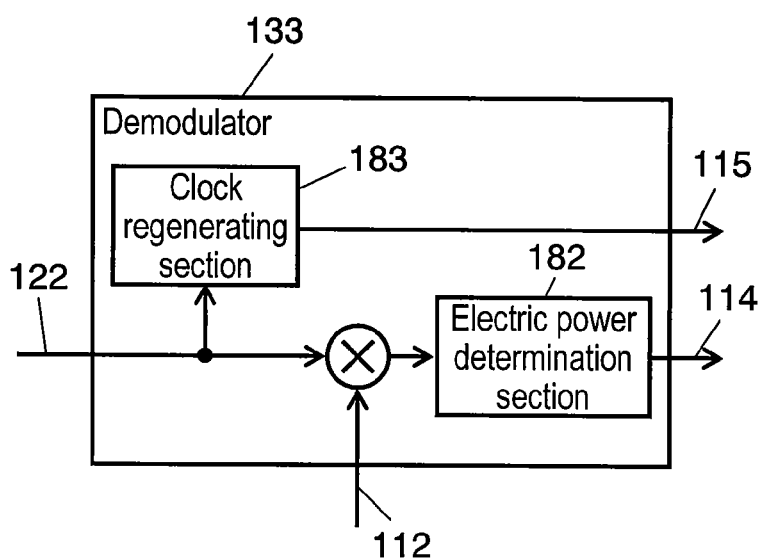
FIG. 6 is a block diagram showing another configuration example of a demodulator in accordance with the first exemplary embodiment of the present invention.

FIG. 6 is a block diagram showing another configuration example of demodulator 113 of the impulse radio communication device in accordance with the first exemplary embodiment of the present invention. In FIG. 6, electric power determination section 182 of demodulator 133 determines electric power in the timing of a reference waveform signal in accordance with signal 122 in an On Off Keying (OOK) method and generates demodulated signal 114. Clock regenerating section 183 generates symbol clock reference signal 115.

Figure 7:
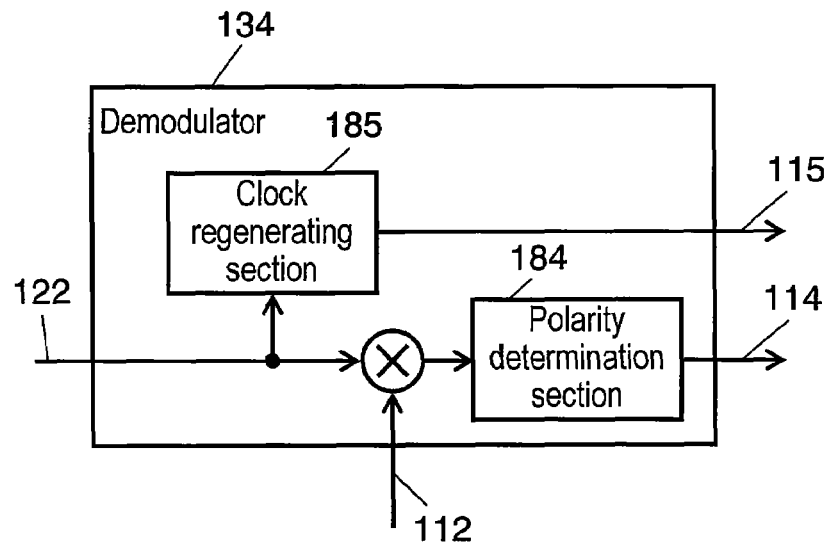
FIG. 7 is a block diagram showing another configuration example of a demodulator in accordance with the first exemplary embodiment of the present invention.

FIG. 7 is a block diagram showing another configuration example of demodulator 113 of the impulse radio communication device in accordance with the first exemplary embodiment of the present invention. In FIG. 7, polarity determination section 184 of demodulation 134 determines the polarity in the timing of a reference waveform signal in accordance with signal 122 in a Bi-Phase modulation method and generates demodulated signal 114. Clock regenerating section 185 generates symbol clock reference signal 115.

Phase comparison section 116 is configured to detect the difference in timing between symbol clock reference signal 115 and reference waveform signal 112 and to output a signal showing the amount of advance or delay of the phase as phase difference signal 117.

Figure 8:
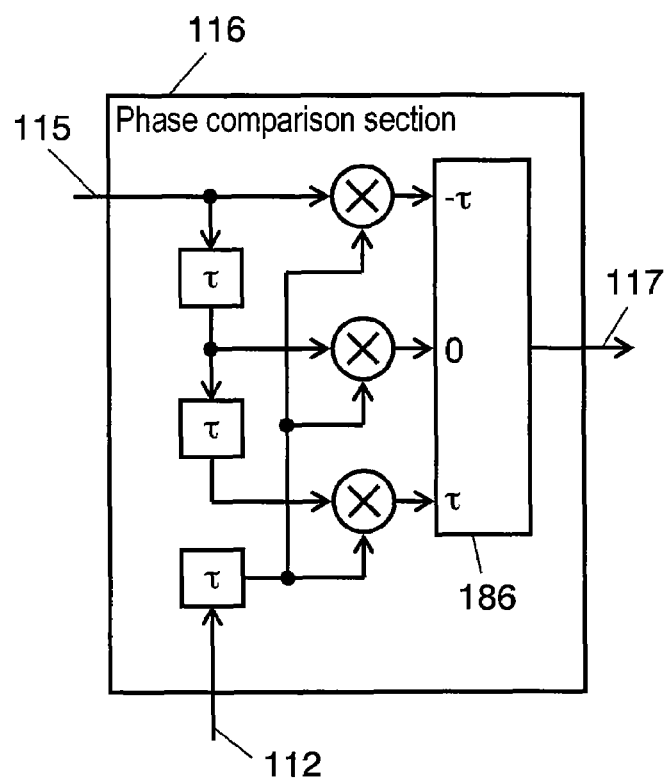
FIG. 8 is a block diagram showing a configuration example of a phase comparison section in accordance with the first exemplary embodiment of the present invention.

FIG. 8 is a block diagram showing a configuration example of a phase comparison section of the impulse radio communication device in accordance with the first exemplary embodiment of the present invention. In FIG. 8, in phase comparison section 116, phase difference wave detector 186 detects the phase difference of reference waveform signal 112 with respect to symbol clock reference signal 115 and outputs the phase relation for each symbol clock reference signal as phase difference signal 117. Herein, τ represents a delay amount for setting a comparison time difference for detecting the difference in timing.

In the impulse radio communication device of this exemplary embodiment, delay amount τ is a fixed value, but delay amount τ may be controlled so that the acquisition range of the phase comparison is variable. Thus, an advantage configuration for reducing the acquisition time can be achieved.

Figure 9:
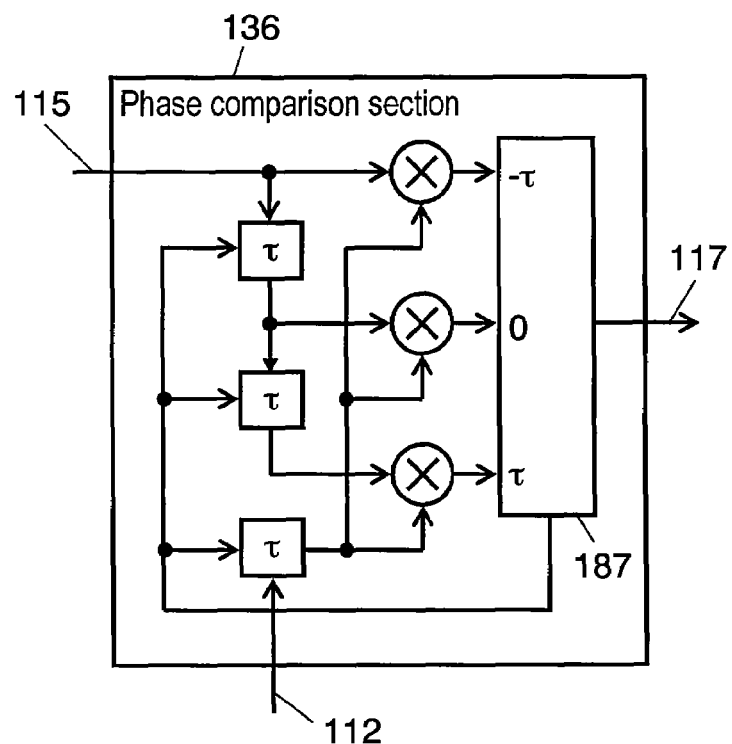
FIG. 9 is a block diagram showing another configuration example of a phase comparison section in accordance with the first exemplary embodiment of the present invention.

FIG. 9 is a block diagram showing another configuration example of a phase comparison section of the impulse radio communication device in accordance with the first exemplary embodiment of the present invention. In FIG. 9, in phase comparison section 136, as in phase comparison section 116 shown in FIG. 8, phase difference detection section 187 detects the phase difference of reference waveform signal 112 with respect to symbol clock reference signal 115 and outputs the phase relation for each symbol clock reference signal as phase difference signal 117. However, phase comparison section 136 is different from phase comparison section 116 in that phase difference detection section 187 enables delay amount X to be controlled.

For example, when the output of phase difference signal 117 shows phase advance (−τ) or delay (τ) sequentially, delay amount τ is controlled to increase; and when the output of phase difference signal 117 shows phase matching (0), advance and delay, alternately, delay amount τ is controlled to reduce. That is to say, in the case where the phase shift at the pull-in starting time is large, the detection range is increased so as to reduce the acquisition time. Furthermore, in the phase acquisition after the phase pull-in, the detection range is narrowed so as to improve the precision of the phase acquisition. Thus, by controlling delay amount τ, it is possible to achieve an advantageous configuration for reducing the acquisition time with the precision of the phase acquisition maintained to be high.

Timing generating section 118 is configured to adjust the phase in accordance with phase difference signal 117 and to generate synchronization timing signal 119 having a frequency that is almost equal to the transmission symbol rate.

Decoding section 120 is configured to generate a data stream obtained by excluding a portion other than data, for example, preamble from demodulated signal 114 and to output it as received data 123. Furthermore, at the same time, decoding section 120 generates a signal showing any one of a "acquisition" mode that is a state in which synchronization has not been acquired and a "tracking" mode that is a state in which synchronization has been acquired and maintained, and outputs the generated signal as synchronization mode signal 121. At this time, determining whether or not synchronization has been acquired is carried out based on whether or not demodulated signal 114 generates a predetermined data stream. Thus, signal is generated so that two modes are switched.

In such a configuration, the operation of the impulse radio communication device in accordance with this exemplary embodiment is described.

After start-up, impulse radio communication device 100 starts to operate in a first mode in which synchronization is acquired from a state in which synchronization has not yet acquired, and adjusts a synchronization timing based on the correlation of received signal 107 with respect to a wide reference waveform so as to determine a synchronization position. Next, when synchronization is acquired, impulse radio communication device 100 operates in a second mode in which a synchronization state is maintained, adjusts the synchronization timing based on the correlation with respect to a narrow reference waveform so as to determine a synchronization position. This switching of the operation modes is controlled when decoding section 120 outputs synchronization mode signal 121.

Firstly, an operation, in which impulse radio communication device 100 is started to operate and then acquires synchronization, is described.

After start-up, impulse radio communication device 100 outputs synchronization mode signal 121 showing the "acquisition" mode from decoding section 120. At this time, switching section 110 is set so as to output a signal of wave detector 108 as demodulation target signal 122. Reference waveform generator section 111 sets switch 504 so that wide reference waveform signal 112 is generated based on second waveform generating section 502 and phase shift section 503.

Subsequently, wave detector 108 envelope-detects received signal 107 to generate detected signal 109. Switching section 110 outputs detected signal 109 as demodulation target signal 122 to demodulator 113. Demodulator 113 determines the correlation between demodulation target signal 122 and reference waveform signal 112 output from reference waveform generator section 111, and demodulates demodulation target signal 122 into demodulated signal 114.

However, in this operation, the generation timing of reference waveform signal 112 needs to be synchronized with a symbol interval of received signal 107. Therefore, a synchronization control loop including demodulator 113, phase comparison section 116, timing generating section 118 and reference waveform generator section 111 secures symbol synchronization of reference waveform signal 112 with respect to received signal 107.

That is to say, demodulator 113 generates symbol clock reference signal 115 showing a basic symbol interval of received signal 107 and supplies it to phase comparison section 116. Phase comparison section 116 detects the phase relation of reference waveform signal 112 with respect to symbol clock reference signal 115 and outputs the correlation for each symbol clock reference signal 115 as phase difference signal 117. Timing generating section 118 generates synchronization timing signal 119 in which the timing is adjusted in accordance with phase difference signal 117; reference waveform generator section 111 generates the above-mentioned reference waveform signal 112 in accordance with adjusted synchronization timing signal 119.

With these operations mentioned above, in impulse radio communication device 100, demodulator 113 demodulates received signal 107 based on the correlation with reference waveform signal 112 in which symbol synchronization has been established, and the synchronization control loop and decoding section 120 obtain synchronization with received signal 107.

Next, an operation, in which impulse radio communication device 100 maintains synchronization after the acquisition of synchronization, is described.

In impulse radio communication device 100, when synchronization with received signal 107 is acquired, decoding section 120 outputs synchronization mode signal 121 showing the "tracking" mode. At this time, switching section 110 changes the setting so that received signal 107 is input. Reference waveform generator section 111 sets switch 504 so that narrow reference waveform signal 112 based on second waveform generating section 502 and first waveform generating section 501 is generated.

Subsequently, switching section 110 outputs received signal 107 as it is as demodulation target signal 122. Reference waveform generator section 111 outputs narrow reference waveform signal 112 that is similar to received signal 107. Demodulator 113 determines the correlation between demodulation target signal 122 and reference waveform signal 112, and, based on the determination results, demodulates demodulation target signal 122 into demodulated signal 114.

However, in this operation, the generation timing of reference waveform signal 112 needs to be synchronized with the symbol interval of received signal 107. Therefore, similar to the operation when synchronization is acquired, a synchronization control loop including demodulator 113, phase comparison section 116, timing generating section 118 and reference waveform generator section 111 secures symbol synchronization of reference waveform signal 112 with respect to received signal 107.

With these operations mentioned above, based on the correlation with reference waveform signal 112 in which symbol synchronization has been established, demodulator 113 demodulates received signal 107 and decoding section 120 obtains received data 123.

Next, the property of the reference waveform generated by reference waveform generator section 111 is described. Ideal impulse waveform F (t) of the impulse signal is defined by Equation 1, in which F0 represents band center frequency and W represents bandwidth.

(Equation 1)

$$F(t) = \frac{\sin(2\pi W t)}{\pi t} \cos(2\pi F 0 t)$$

In impulse waveform F(t), when W=F0 is satisfied, the term of cos in impulse waveform F(t) represents a reference signal of frequency F0 and the term including sin represents a signal in which the amplitude changes over time and the reference signal is shifted by 90° at the frequency F0.

Figure 10:
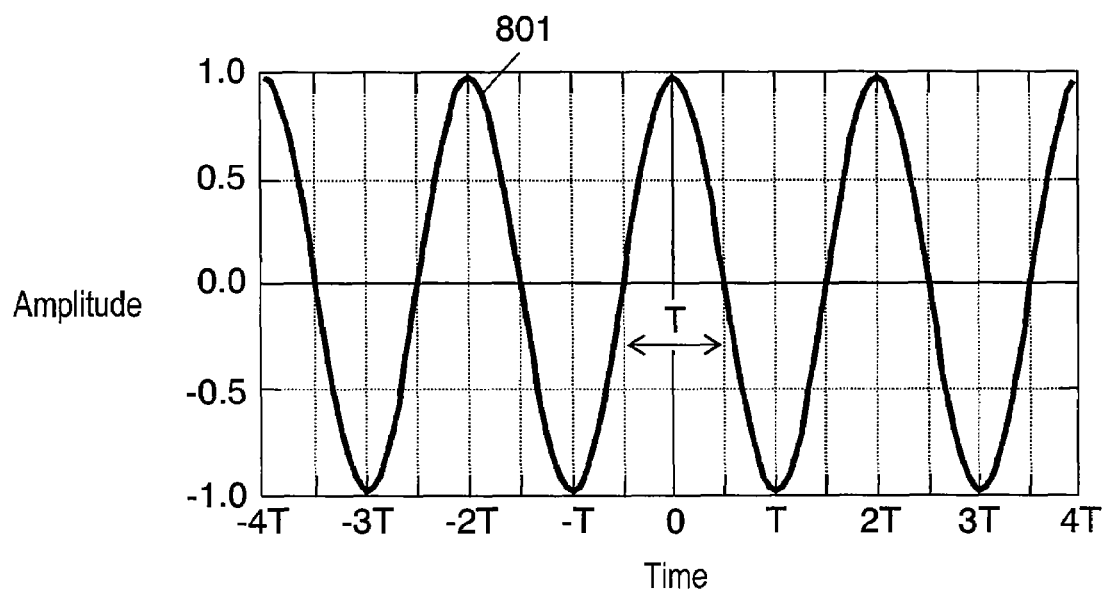
FIG. 10 is a graph showing an example of a frequency component waveform of an impulse waveform.

FIG. 10 is a graph showing an example of a frequency component waveform of an impulse waveform. Frequency component waveform 801 shows a waveform represented by the term of cos in Equation 1.

Figure 11:
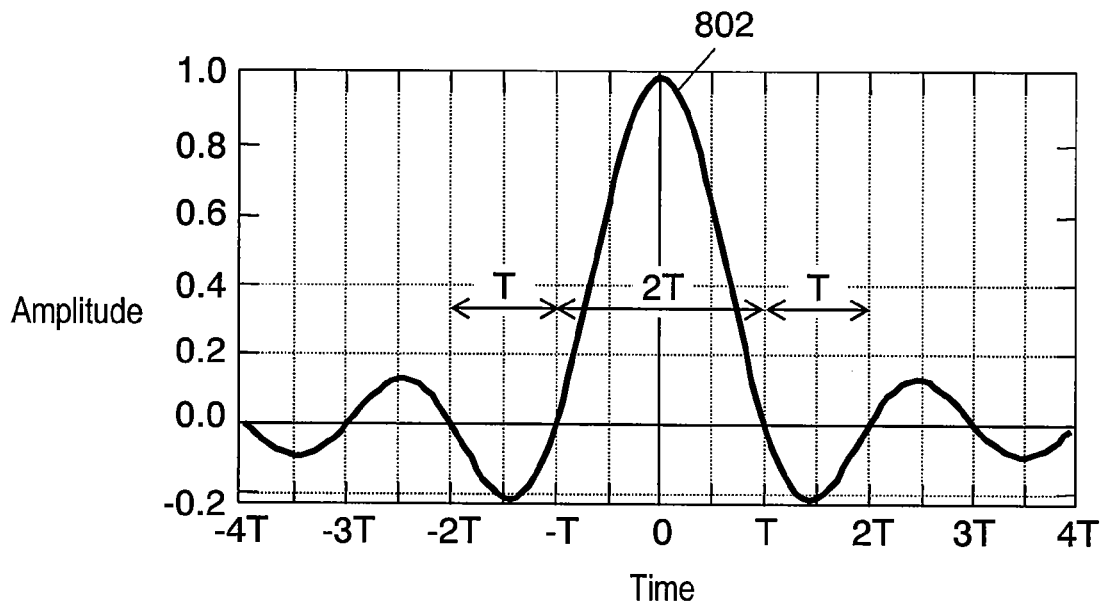
FIG. 11 is a graph showing an example of an amplitude component waveform of an impulse waveform.

FIG. 11 is a graph showing an example of an amplitude component waveform of an impulse waveform. Amplitude component waveform 802 shows a waveform represented by the term including sin in Equation 1.

Figure 12:
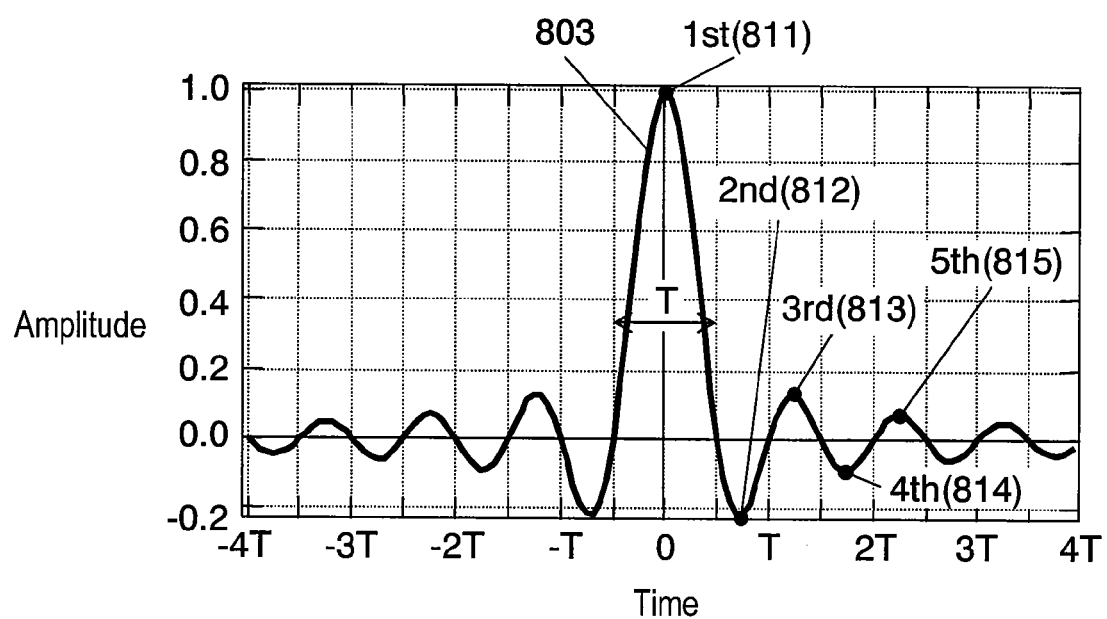
FIG. 12 is a graph showing an example of an impulse waveform.

FIG. 12 is a graph showing an example of an impulse waveform. Impulse waveform 803 shows impulse waveform F (t) represented by Equation 1. In FIG. 12, the first to fifth peak values of impulse waveform 803 are amplitudes represented by points 811 to 815.

Figure 13:
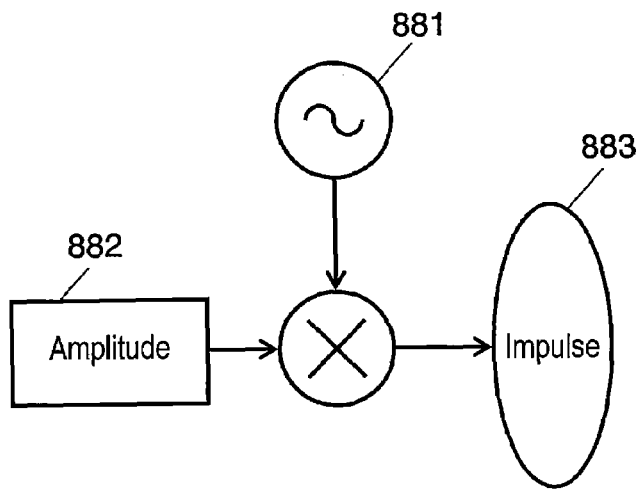
FIG. 13 is a view to illustrate an operation of generating an impulse waveform.

FIG. 13 is a view to illustrate an operation of generating an impulse waveform from the frequency component waveform and the amplitude component waveform. Impulse waveform F (t) (883) is synthesized by multiplication of frequency component waveform (881) and amplitude component waveform (882).

With respect to the ideal impulse waveform (Equation 1), in reference waveform generator section 111 of the impulse radio communication device of the exemplary embodiment, first waveform generating section 501 generates a waveform corresponding to the term of cos in Equation 1, and second waveform generating section 502 and phase shift section 503 generate a waveform corresponding to the term of sin. Furthermore, phase shift section 503 adjusts the 90-degree phase between waveform 801 shown in FIG. 10 and waveform 802 shown in FIG. 11.

Then, reference waveform generator section 111 widens the pulse width of reference waveform signal 112 used for the correlation and roughly determines the synchronization position at the time of acquisition. Furthermore, it detects a large number of correlations simultaneously. This reduces the possibility that synchronization is pulled in by the correlation of path having low receive electric power.

With such a configuration, the impulse radio communication device of this exemplary embodiment generates a reference waveform signal having wider pulse width than the impulse waveform of the received signal even when a plurality of correlation positions exist due to multipath. This enables synchronization positions to be averaged and makes it difficult that synchronization is pulled in a correlation position having low electric power.

Furthermore, the impulse radio communication device of this exemplary embodiment stresses the correlation of the demodulator in a way in which a reference waveform signal generating an inverse correlation portion outside a main lobe of the reference waveform signal is generated. This enables an efficient acquisition.

In the impulse radio communication device of this exemplary embodiment, switch 504 outputs constant signal 514 and mixer 505 outputs second waveform signal 513 of the amplitude component as reference waveform signal 112 when the impulse radio communication device is operated in the "acquisition" mode. At this time, the impulse width of reference waveform signal 112 comes to be about two times as wide as that of received signal 107 when W=F0 is satisfied. In this case, reference waveform signal 112 has a wider width than received signal 107, and when the impulse signal existing in the main lobe of reference waveform signal 112 has positive and negative polarities, electric power is reduced due to cancellation. Therefore, the impulse radio communication device of this exemplary embodiment is configured so that detected signal 109 obtained by envelope-detecting the received impulse signal by wave detector 108 makes a demodulation target when the signal width of reference waveform signal 112 is widened.

Note here that the impulse radio communication device of this exemplary embodiment employs a pulse phase modulation of shifting over time pulse positions as a modulation method of receiving a signal, and thus synchronization is acquired and maintained. However, the same advantage can be obtained even when a form of biphase modulation for inverting the phase of generated pulse in accordance with binary transmission data, or a form of on-off modulation is employed.

Note here that the impulse radio communication device of this exemplary embodiment has a form in which the configuration of the impulse radio communication is limited to receiving function. However, the same advantage can be obtained by employing a form of transmitting and receiving impulse data by loading transmitting function.

Note here that the impulse radio communication device of this exemplary embodiment has a form so as to generate a timing for envelope detection from an envelope waveform signal and to generate a timing for synchronous detection from the synchronization timing signal in the generation of reference waveform signal. However, the device may have a form so as to generate a pulse position for synchronous detection from an envelope detection signal and to determine the frequency and phase of a signal for synchronous detection from a synchronization timing signal. Thus, time for determining a pulse position, frequency and phase can be reduced and the time until communication starts can be reduced.

Figure 14:
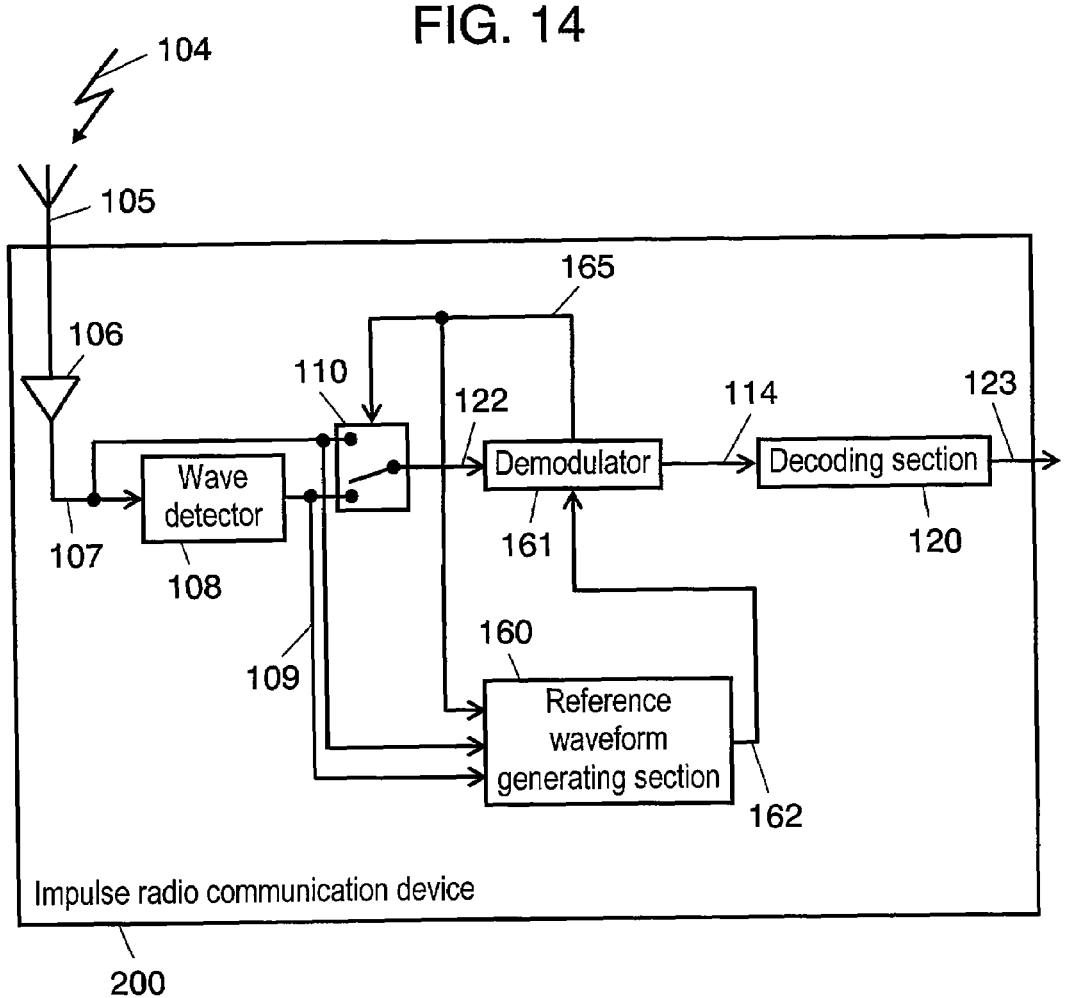
FIG. 14 is a block diagram showing another configuration of an impulse radio communication device in accordance with the first exemplary embodiment of the present invention.

Herein, an impulse radio communication device having such a configuration is described. FIG. 14 is a block diagram showing a configuration of an impulse radio communication device including a plurality of reference waveform generating portions. In FIG. 14, impulse radio communication device 200 has almost the same configuration as that of impulse radio communication device 100 shown in FIG. 1, but device 200 and device 100 are different from each other in the following point.

Reference waveform generating section 160 of impulse radio communication device 200 receives input of received signal 107 and detected signal 109 and generates reference waveform signal 162. Reference waveform signal 162 has a pulse phase synchronized with a phase timing of received signal 107 and a pulse position and frequency of detected signal 109. Demodulator 161 generates demodulated signal 114 from demodulation target signal 122 and reference waveform signal 162. Furthermore, demodulator 161 generates synchronization mode signal 165 by determining the receiving state in accordance with the demodulation state at this time. Switching section 110 switches demodulation target signal 122 output in accordance with synchronization mode signal 165. Furthermore, reference waveform generating section 160 switches the waveform of reference waveform signal 162 in accordance with synchronization mode signal 165.

Note here that the impulse radio communication device of this exemplary embodiment has a form including a reference waveform generating section and generating a reference waveform signal from any one of the received signal and the detected signal in accordance with the receiving state. However, the same advantage can be obtained when the device has a form in which a plurality of reference waveform generating sections corresponding to the signals of the received signal and the detected signal are provided to generate a plurality of different reference waveform signals simultaneously and the demodulator selects the signal in accordance with the receiving state. At this time, in accordance with the plurality of generated reference waveform signals, the receiving state may be determined.

Figure 15:
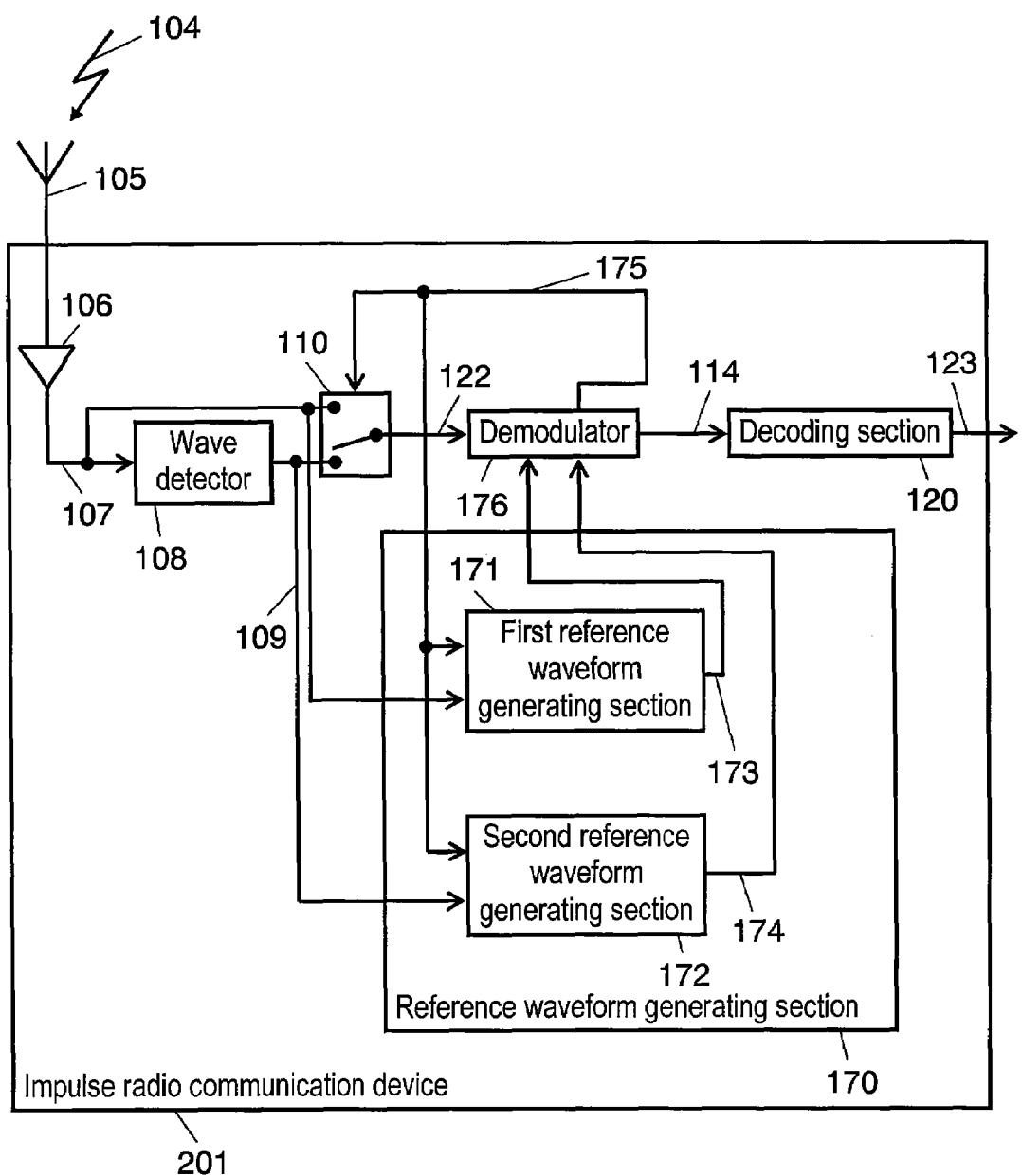
FIG. 15 is a block diagram showing another configuration of an impulse radio communication device in accordance with the first exemplary embodiment of the present invention.

Herein, an impulse radio communication device having such a configuration is described. FIG. 15 is a block diagram showing a configuration of an impulse radio communication device having a plurality of reference waveform generating sections. In FIG. 15, impulse radio communication device 201 has substantially the same configuration as that of the impulse radio communication device 100 shown in FIG. 1.

Reference waveform generating section 170 of impulse radio communication device 201 includes first reference waveform generating section 171 and second reference waveform generating section 172. First reference waveform generating section 171 generates first reference waveform signal 173 corresponding to received signal 107. Second reference waveform generating section 172 generates second reference waveform signal 174 corresponding to detected signal 109. Demodulator 176 selects either first reference waveform signal 173 or second reference waveform signal 174 in accordance with a current synchronization mode and generates demodulated signal 114 from demodulation target signal 122. Furthermore, demodulator 176 determines the receiving state in accordance with demodulation target signal 122 or first reference waveform signal 173 and second reference waveform signal 174 and generates synchronization mode signal 175. Switching section 110 switches demodulation target signal 122 to be output in accordance with synchronization mode signal 175.

Note here that the impulse radio communication device of this exemplary embodiment has a form in which the decoding section determines a receiving state in accordance with a demodulated signal and generates a synchronization mode signal. However, the impulse radio communication device may have a form in which the demodulator detects that the synchronization precision of the synchronization timing signal becomes lower than a predetermined precision based on the input demodulation target signal and/or reference waveform signal and generates an external switching signal, and the switching section switches a demodulation target signal to a detected signal in accordance with this external switching signal. The thus configured impulse radio communication device temporarily carries out switching to an envelope detection signal similar to that in the acquisition mode and carries out acquisition along with demodulation processing when, for example, the synchronization shift occurs and the precision becomes lower than the precision necessary for wave-detection of synchronization in the tracking mode. Therefore, communication can be continued with deterioration of the communication state suppressed.

Furthermore, the impulse radio communication device may have a form in which the demodulator detects that the difference in synchronization timing when the acquisition mode is switched to the tracking mode is larger than a predetermined value and generates a synchronization mode signal showing the detection of synchronization error, and the reference waveform generating section generates and outputs a reference waveform signal in the more precise tracking mode. The thus configured impulse radio communication device gives priority to synchronous detection in the more precise tracking mode in the case where, for example, a plurality of synchronization timings appear due to multipath when the mode is switched to the tracking mode. Therefore, it is possible to avoid synchronization error due to multipath. Furthermore, at this time, the impulse radio communication device may have a form in which a plurality of different reference waveform generating sections for generating the reference waveforms with respect to the received signal and detected signal respectively generate a plurality of different reference waveform generation signals simultaneously, and the demodulator selects the signal in accordance with the receiving state.

Note here that it is desirable that this predetermined value for determining that the difference in the synchronization timing is large be set to different values depending on applications used by the impulse radio communication device. For example, the determination value may be set to ±10% of the pulse width.

Furthermore, the impulse radio communication device may have a form in which when the demodulator determines that a plurality of synchronization timings appear due to, for example, distortion of the waveform of the demodulated signal, the reference waveform generating section narrows the signal width of the reference waveform signal. The thus configured impulse radio communication device does not wrongly detect a plurality of synchronization timings as one timing, and therefore, synchronization error can be avoided.

Note here that the impulse radio communication device of this exemplary embodiment has a configuration in which the timing of switching between envelope detection and synchronous detection is determined based on whether the synchronization state is a acquisition mode or a tracking mode. However, the impulse radio communication device may have a form in which, for example, the envelope detection is continuously selected by determining that the synchronization state is the acquisition mode when the transmission rate is lower than a predetermined value, and switching to synchronous detection is carried out by determining that the synchronization state is the tracking mode when the transmission rate exceeds a predetermined value. The thus configured impulse radio communication device can operate at low consumption power with a simple configuration when the transmission rate is low and can carry out demodulation with high precision even when the transmission rate is high. In this case, the timing of switching operations based on the transmission rate may be determined at the side of the impulse receiving device and may be determined by an instruction from the side of the transmission device.

It is desirable that the error rate in switching the synchronization modes is set to be different values depending upon applications used by the impulse radio communication device. For example, the value of the error rate may be set to be a bit error rate of 1/10000.

Furthermore, this timing of switching between the envelope detection and the synchronous detection may be determined in accordance with the communication environment by multipath. For example, when a few multipaths exist, communication is carried out in the acquisition mode. When the error rate in demodulation exceeds a predetermined rate, by switching the acquisition mode to the tracking mode, communication deterioration due to multipath can be avoided. In this case, the timing of switching between operations may be determined at the side of a receiving device and may be determined by an instruction from the side of a transmission device.

Second Exemplary Embodiment

Next, an impulse radio communication device in accordance with a second exemplary embodiment of the present invention is described. The impulse radio communication device in accordance with this exemplary embodiment has a circuit configuration in which a plurality of delayed signals are generated from a synchronization timing signal and a reference waveform signal is generated based on the plurality of delayed signals. This circuit configuration allows the coarse synchronization and the phase to be synchronized with each other. In this exemplary embodiment, a configuration of generating an impulse waveform when central frequency F0 and band width W have an equal impulse waveform is described. At this time, time length T is ½ with respect to the period of center frequency F0, that is, the relation: T=1/(2·F0) is satisfied.

The configuration of the impulse waveform generating device of this exemplary embodiment is described.

Since the configuration of the impulse radio communication device is substantially the same as that shown in the first exemplary embodiment, the description of the common parts are omitted and only the difference is described.

Figure 16:
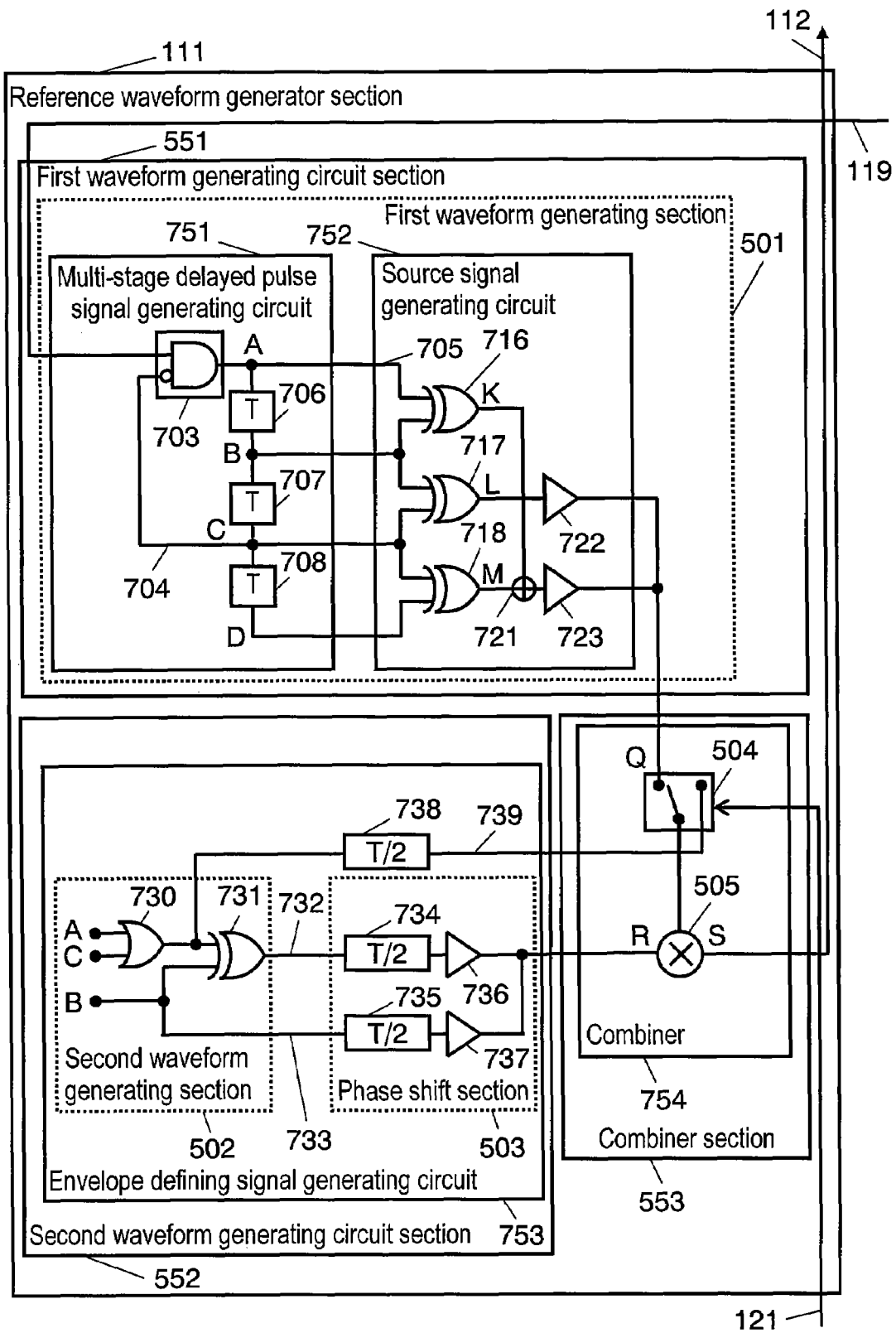
FIG. 16 is a block diagram showing a configuration example of a reference waveform generating section in accordance with a second exemplary embodiment of the present invention.

FIG. 16 is a block diagram showing a configuration example of a reference waveform generator section of the impulse waveform generating device in accordance with the second exemplary embodiment of the present invention. In FIG. 16, reference waveform generator section 111, almost similar to the configuration shown in FIG. 4, includes first waveform generating circuit section 551, second waveform generating circuit section 552, and combiner section 553. Furthermore, reference waveform generator section 111 is coupled to timing generating section 118 and decoding section 120. Timing generating section 118 generates synchronization timing signal 119 showing a timing at which an impulse waveform is to be generated, and decoding section 120 outputs synchronization mode signal 121.

First waveform generating circuit section 551 includes multi-stage delayed pulse signal generating circuit 751 and source signal generating circuit 752. Circuit 751 includes signal control section 703 and delay elements 706, 707 and 708, and generates a plurality of delayed pulse signals from synchronization timing signal 119. Furthermore, source signal generating circuit 752 includes exclusive-OR elements 716, 717 and 718, voltage adding element 721, and amplifiers 722 and 723, and generates a signal source signal showing a frequency component of the reference waveform signal from the delayed pulse signal. In the description mentioned below, first waveform generating section 501 includes multi-stage delayed pulse signal generating circuit 751 and source signal generating circuit 752.

Second waveform generating circuit section 552 includes envelope defining signal generating circuit 753. Circuit 753 includes inclusive-OR element 730, exclusive-OR element 731, delay elements 734, 735 and 738, and amplifiers 736 and 737, and generates an envelope formation signal showing an amplitude component of the reference waveform signal from the delayed pulse signal. In the description mentioned below, circuit 753 includes second waveform generating section 502 for generating a timing waveform and phase shift section 503 for delaying and amplifying the timing waveform.

Combiner section 553 includes combiner 754. Combiner 754 includes mixer 505 and switch 504. Combiner 754 outputs an envelope formation signal as reference waveform signal 112 when a synchronization mode signal is in a acquisition mode, and synthesizes a signal source signal and the envelope formation signal and outputs the synthesized signal as reference waveform signal 112 when the synchronization mode signal is in a tracking mode.

Signal control section 703 constituting multi-stage delayed pulse signal generating circuit 751 receives input of synchronization timing signal 119 and control signal 704. Signal control section 703 outputs synchronization timing signal 119 as reference time signal 705 only when control signal 704 is in a state of high level value (hereinafter, referred to as "H state" or "High state"). Furthermore, signal control section 703 stops outputting when control signal 704 is in a state of low level value (hereinafter, referred to as "L state" or "Low state"). In this exemplary embodiment, signal control section 703 is realized by a circuit configuration including an inverting circuit and an AND circuit.

Delay elements 706, 707 and 708 are configured to delay the input signals by time T, respectively, and output them. When reference time signal 705 is defined as signal A, delay element 706 generates signal B obtained by delaying signal A by time T. Delay element 707 generates signal C obtained by delaying signal B by time T. Note here that this signal C is supplied to signal control section 703 as control signal 704. Delay element 708 generates signal D obtained by delaying signal C by time T.

Exclusive-OR elements 716, 717 and 718 constituting source signal generating circuit 752 are configured to operate exclusive-ORs of the respective input signals and output them. Exclusive-OR element 716, exclusive-OR element 717 and exclusive-OR element 718 operate exclusive-OR of signal A and signal B, exclusive-OR of signal B and signal C and exclusive-OR of signal C and signal D, respectively, and output the exclusive-ORs as signals K, L and M, respectively.

Voltage adding element 721 is configured to output a voltage added value of signal K and signal M.

Amplifier 722 amplifies signal L at a predetermined magnification. Amplifier 723 amplifies an output signal from voltage adding element 721 at a predetermined magnification. Thereafter, first waveform generating section 501 integrates output signals from amplifiers 722 and 723 and to obtain first waveform signal Q.

Second waveform generating section 502 constituting envelope defining signal generating circuit 753 is configured to output first control signal 732 showing time 0-T and time 3T-4T and second control signal 733 showing time T-3T from the timing at which an impulse waveform is to be generated. In this exemplary embodiment, second waveform generating section 502 includes inclusive-OR element 730 computing a logical OR of signal A and signal C and exclusive-OR 731 computing a exclusive OR of further signal B, thereby outputting first control signal 732 showing time 0-T and time 3T-4T from the timing at which the impulse waveform is to be generated. Furthermore, in this configuration, signal B outputs as second control signal 733 showing time T-3T as it is.

Delay element 734 constituting phase shift section 503 is configured to delay first control signal 732 by time T/2, and delay element 735 is configured to delay second control signal 732 by time T/2.

Amplifiers 736 and 737 amplify the respective input signals at a predetermined magnification. Phase shift section 503 is configured to integrate the output signals from amplifiers 736 and 737 so as to obtain second waveform signal R.

Delay element 738 is configured to delay output A+C from inclusive-OR element 730 by time T/2.

Switch 504 constituting combiner section 553 is configured to output signal 739 output by delay element 738 when input synchronization mode signal 121 shows the "acquisition" mode and to output first waveform signal Q generated by first waveform generating section 501 when synchronization mode signal 121 shows the "tracking" mode.

Mixer 505 is configured to mix first waveform signal Q and second waveform signal R and obtain a desired impulse waveform signal S, that is, reference waveform signal 112.

Note here that amplification factors b, a, β and α of amplifiers 722, 723, 736 and 737 in this exemplary embodiment are described later.

An operation of the thus configured impulse radio communication device of this exemplary embodiment is described.

The impulse radio communication device of this exemplary embodiment acquires and maintains synchronization of signals by the same process as in the first exemplary embodiment. Herein, an operation of generating reference waveform signal 112 by reference waveform generator section 111 is described and the description of the other operations are omitted.

Reference waveform generator section 111 receives input of synchronization timing signal 119 whose time width Tau, which shows a timing at which a reference waveform is to be generated from timing generating section 118, is 2T or more and less than 4T. Signal control section 703 constituting reference waveform generator section 111 outputs synchronization timing signal 119 as reference time signal 705 when control signal 704 is in the H state, and stops outputting when control signal 704 is in the L state.

Delay elements 706, 707 and 708 generate signal B that is delayed by time T from reference time signal 705, that is, signal A, signal C that is further delayed by time T, and signal D that is further delayed by time T. Herein, signal C, that is, a signal showing the lapse of time 2T after generation of synchronization timing signal 119 is supplied to signal control section 703 as control signal 704 so as to adjust the time width of reference time signal 705 to 2T.

Exclusive-OR elements 716, 717 and 718 generate signals K, L and M that are operation results of the exclusive-OR from signals A, B, C and D. Furthermore, voltage adding element 721 outputs voltage added value of signals K and M. Amplifier 722 amplifies signal L at a predetermined magnification, and amplifier 723 amplifies the output signal of voltage adding element 721 at a predetermined magnification. Then, first waveform generating section 501 integrates the output signals from amplifiers 722 and 723 and generates first waveform signal Q.

Furthermore, second waveform generating section 502 outputs first control signal 732 showing time 0-T and time 3T-4T and second control signal 733 showing time T-3T with respect to the timing at which the reference waveform is to be generated.

Delay element 734 delays first control signal 732 by time T/2, delay element 735 delays second control signal 733 by time T/2, and amplifiers 736 and 737 amplify these delayed signals at respective predetermined magnifications. Then, phase shift section 503 integrates output signals from amplifiers 736 and 737 so as to generate second waveform signal R.

Delay element 738 delays output A+C from inclusive-OR element 730 by time T/2 and supplies it to switch 504. Switch 504 outputs signal 739 output from delay element 738 when input synchronization mode signal 121 shows the "acquisition" mode, and outputs first waveform signal Q when synchronization mode signal 121 shows the "tracking" mode.

Finally, mixer 505 mixes a signal output from switch 504 and second waveform signal R to generate desired impulse waveform signal S, that is, reference waveform signal 112.

Next, signals generated in the impulse radio communication device of this exemplary embodiment are described.

Figure 17:
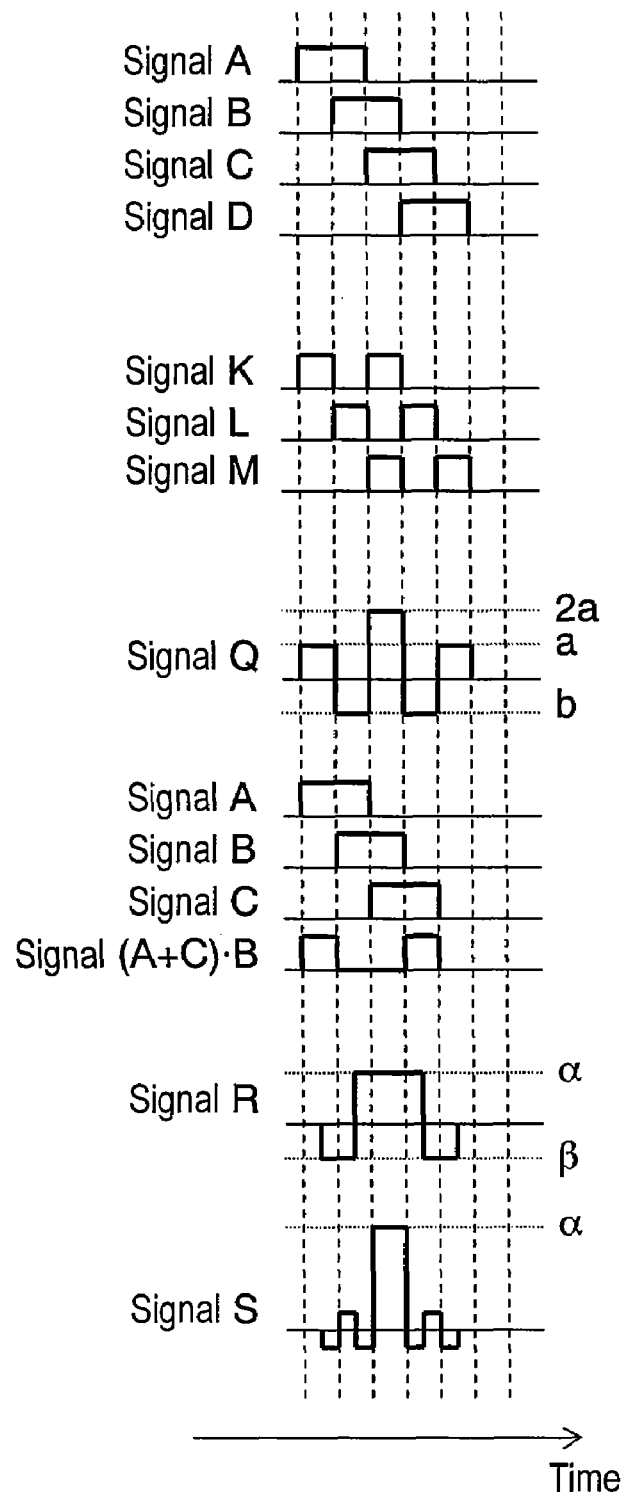
FIG. 17 is a signal transition diagram in the reference waveform generating section in accordance with the second exemplary embodiment of the present invention.
Figure 18:
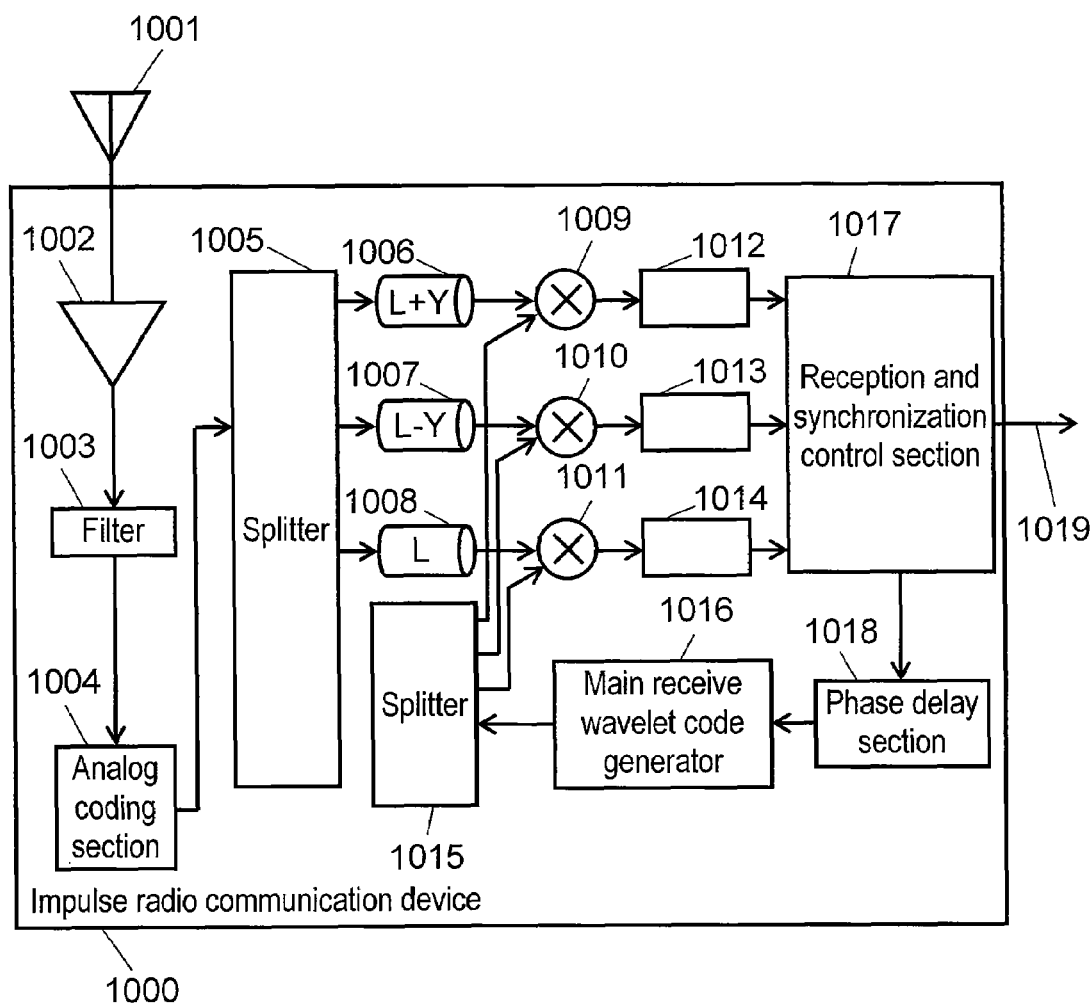
FIG. 18 is a block diagram showing a configuration of a conventional impulse radio communication device.

FIG. 17 is a signal transition diagram in the reference waveform generator section of the impulse radio communication device in accordance with the second exemplary embodiment of the present invention. In FIG. 17, signals A, B, C and D are signals with time width 2T and are generated sequentially at time difference T. Signals K, L and M are pulse signals with time interval T and time width T obtained by operating the exclusive-ORs of signals A and B, signals B and C, and signals C and D, respectively. Signals K, L and M are sequentially generated at time difference T. First waveform signal Q is a waveform generated by amplifiers 722 and 723 by synthesizing signals K+M as positive and signal L as negative. First waveform signal Q is generated as a waveform of the repetition signal every time T.

First control signal 732 is generated as a negative signal waveform obtained from logic operation: (A+C) B. Second control signal 733 is generated as a positive signal waveform of only signal B. Second waveform signal R is generated in a way in which it is delayed with respect to first waveform signal Q by time T/2. Delay elements 734 and 735 delay first control signal 732 and second control signal 733 by time T/2, respectively. Amplifiers 736 and 737 generate a waveform synthesized by a signal obtained by delaying first control signal 732 as a negative amplitude value, and a signal obtained by delaying second control signal 733 as a positive amplitude value.

In FIG. 17, impulse waveform signal S shows a waveform generated when synchronization mode signal 121 is in the "tracking" mode and is generated as a signal waveform synthesizing first waveform signal Q and second waveform signal R by using mixer 505. When synchronization mode signal 121 is in the "acquisition" mode, a signal obtained by delaying signal A+C by time T/2, that is, a signal showing the time at which second waveform signal R exists is output. In mixer 505, second waveform signal R having a wide pulse width is generated as it is.

Next, the property of the reference waveform signal generated in reference waveform generator section 111 of the impulse radio communication device of this exemplary embodiment is described.

Logical values of the first to fifth peak values in impulse waveform F (t) shown in the first exemplary embodiment are respectively 1.000, −0.214, 0.129, −0.091 and 0.071 from Equation 1. With respect to such an ideal impulse waveform F (t), in this exemplary embodiment, a signal waveform corresponding to the term of cos in equation 1 is normalized by first waveform signal Q, and a signal waveform corresponding to the term of sin is normalized by second waveform signal R.

Furthermore, peak values of the reference waveform signal in the "tracking" mode, which correspond to the peak values of impulse waveform F (t), are normalized by the amplification factors of amplifiers 722, 723, 736 and 737. In particular, in order to obtain a reference waveform signal having a precise peak value, amplification factors b, a, β, and α of amplifiers 722, 723, 736 and 737 are set to −0.214, 0.500, −0.603 and 1.000, respectively. Among these values, as to the amplifier whose amplification factor is represented by a negative value, the absolute value of the negative value is employed as the amplification factor, showing that a signal whose phase is inverted at the time when the signal is output. Furthermore, these values can be determined by a calculation equation in accordance with the circuit configuration. Furthermore, the number of digits of the effective values can be determined from elements constituting the circuit and the conditions of the manufacturing process, and the like.

The first to fourth peak values of reference waveform signal 112 generated by the impulse radio communication device of this exemplary embodiment are 1.000, −0.214, 0.129 and −0.301. Thus, the first to third peak values of the impulse waveform F (t) can be matched to the logical values, and error in the fourth peak value is about 20% with respect to the maximum amplitude, which exhibits almost ideal waveform. Note here that in this exemplary embodiment, the fifth peak value is not reproduced.

With such a configuration, the impulse radio communication device of this exemplary embodiment has a configuration in which reference waveform generator section 111 does not use a transmitter and a signal that serves as an impulse signal source is generated from a synchronization timing signal by a multi-stage delay element, and the generated signal is mixed with a signal forming an envelope so as to generate a reference waveform signal. Furthermore, the impulse radio communication device of this exemplary embodiment is particularly suitable for IC.

Furthermore, the impulse radio communication device of this exemplary embodiment appropriately sets an amplification parameter value when signals are mixed and generates a reference waveform signal having a particularly precise peak value when synchronization is maintained. Thus, the received signal can be demodulated.

INDUSTRIAL APPLICABILITY

The impulse radio communication device of the present invention can reduce acquisition error in a multipath transmitting environment and is useful for radio communication device such as UWB radio communication device, and the like, using an impulse communication method.

The invention claimed is:

1. An impulse radio communication device, comprising
a wave detector for envelope-detecting a received signal and generating a detected signal;
a switching section for selecting any one of the received signal and the detected signal in accordance with an external control signal and outputting the selected signal as a demodulation target signal;
a reference waveform generating section synchronized with a phase timing of the demodulation target signal and generating a reference waveform signal having a different waveform in accordance with the external control signal;
a demodulator for receiving input of the demodulation target signal and generating a demodulated signal in accordance with the reference waveform signal; and
a decoding section for receiving input of the demodulated signal and decoding received data from the received signal,
wherein the demodulation target signal and the reference waveform signal are switched simultaneously in accordance with a receiving and synchronizing state, and the received signal is synchronized.

2. The impulse radio communication device of claim 1, wherein
the decoding section further generates a synchronization mode signal showing the receiving and synchronizing state and inputs the generated signal to the switching section and the reference waveform generating section respectively as the external control signal.

3. The impulse radio communication device of claim 2, wherein
the decoding section shows any one of a acquisition mode that is a state in which a synchronization pulse position is not acquired and a tracking mode that is a state in which a synchronization pulse position is acquired and synchronization in a phase level is maintained as the synchronization mode signal,
the switching section outputs the detected signal as the demodulation target signal when the synchronization mode signal is in the acquisition mode, and outputs the received signal as the demodulation target signal when the synchronization mode signal is in the tracking mode, and
the reference waveform generating section outputs a waveform signal having a wider pulse width than the received signal as the reference waveform signal when the synchronization mode signal is in the acquisition mode, and outputs a waveform signal having a same pulse width as that of the received signal as the reference waveform signal when the synchronization mode signal is in the tracking mode.

4. The impulse radio communication device of claim 3, wherein
the reference waveform generating section comprises:
a phase comparison section for receiving input of a symbol clock reference signal showing a pulse timing of the demodulation target signal and generating a phase difference signal showing a phase difference between the symbol clock reference signal and the reference waveform signal;
a timing generating section for receiving input of the phase difference signal, and generating a synchronization timing signal having substantially equal frequency to a transmission symbol rate by adjusting a phase; and
a reference waveform generator section for receiving input of the synchronization timing signal and generating the reference waveform signal in accordance with the synchronization mode signal.

5. The impulse radio communication device of claim 3, wherein
the demodulator detects a difference in a synchronization timing when the acquisition mode is switched to the tracking mode, generates a synchronization error detection signal for switching the demodulation target signal output by the switching section to the detected signal when the difference in the synchronization timing is larger than a predetermined value, and inputs the generated signal to the switching section and the reference waveform generating section as an external control signal respectively, and
the reference waveform generating section generates the reference waveform signal having a narrower pulse width than a pulse width at a time of tracking mode in accordance with the input of the synchronization error detection signal.

6. The impulse radio communication device of claim 3, wherein
the reference waveform generator section comprises:
a first waveform generating circuit section for receiving input of the synchronization timing signal and generating a first waveform signal showing an amplitude component of the reference waveform signal;
a second waveform generating circuit section for receiving input of the synchronization timing signal and generating a second waveform signal showing a frequency component of the reference waveform signal; and
a combiner for outputting the second waveform signal as the reference waveform signal when the synchronization mode signal is in the acquisition mode, and synthesizes the first waveform signal and the second waveform signal and outputs the signal as the reference waveform signal when the synchronization mode signal is in the tracking mode.

7. The impulse radio communication device of claim 6, wherein
the first waveform generating circuit section comprises a multi-stage delayed pulse signal generating circuit for generating a plurality of delayed pulse signals from the synchronization timing signal, and a source signal generating circuit for generating a signal source signal showing a frequency component of the reference waveform signal from the delayed pulse signal,
the second waveform generating circuit section comprises an envelope defining signal generating circuit for generating an envelope formation signal showing an amplitude component of the reference waveform signal from the delayed pulse signal, and the combiner comprises a combiner for outputting the envelope formation signal as the reference waveform signal when the synchronization mode signal is in the acquisition mode, and synthesizing the signal source signal and the envelope formation signal and outputting the synthesized signal as the reference waveform signal when the synchronization mode signal is in the tracking mode.

8. The impulse radio communication device of claim 7, wherein
the multi-stage delayed pulse signal generating circuit controls the output of the synchronization timing signal by the generated delayed pulse signals and generates delayed pulse signals in which all the signal widths are same.

9. The impulse radio communication device of claim 7, wherein
the multi-stage delayed pulse signal generating circuit is coupled in series to a plurality of delay elements having a same delay amount, and outputs a tap-output signal as the delayed pulse signal.

10. The impulse radio communication device of claim 7, wherein
the source signal generating circuit comprises a plurality of amplifiers amplifying a signal at a predetermined amplification factor, and
the plurality of amplifiers amplify the plurality of signals generated from the delayed pulse signal at a predetermined amplification factor respectively and synthesize the amplified signals to generate the signal source signal.

11. The impulse radio communication device of claim 10, wherein
the amplification factor of the amplifier is set as a positive value or a negative value,
when the amplification factor is positive, a signal obtained by amplifying an input signal by a value of the amplification factor is output, and when the amplification factor is negative, a signal obtained by amplifying the input signal by an absolute value of the amplification factor so as to inverse the phase is output.

12. The impulse radio communication device of claim 7, wherein
the envelope defining signal generating circuit comprises:
a plurality of adjustment delay elements in which a delay amount is ½ of a delay amount of the delay element, and
a plurality of amplifiers for amplifying a signal at a predetermined amplification factor, and
the adjustment delay element delays the plurality of signals generated from the delayed pulse signal respectively, and
the plurality of amplifiers synthesize the respective signals amplified at a predetermined amplification factor by the amplifier and generate the envelope formation signal delayed by ½ of the delay amount of the delay element with respect to the signal source signal.

13. The impulse radio communication device of claim 12, wherein
the amplification factor of the amplifier is set as a positive value or a negative value,
when the amplification factor is positive, a signal obtained by amplifying an input signal by a value of the amplification factor is output, and when the amplification factor is negative, a signal obtained by amplifying the input signal by an absolute value of the amplification factor so as to inverse the phase is output.

14. The impulse radio communication device of claim 2, wherein
the decoding section shows any one of a acquisition mode that is a state in which a synchronization pulse position is not acquired and a tracking mode that is a state in which a synchronization pulse position is acquired and synchronization in a phase level is maintained as the synchronization mode signal,
the switching section outputs the detected signal as the demodulation target signal when the synchronization mode signal is in the acquisition mode, and outputs the received signal as the demodulation target signal when the synchronization mode signal is in the tracking mode, and
the reference waveform generating section outputs an envelope waveform signal of the received signal as the reference waveform signal when the synchronization mode signal is in the acquisition mode, and outputs a similar waveform signal of the received signal as the reference waveform signal when the synchronization mode signal is in the tracking mode.

15. The impulse radio communication device of claim 2, wherein
the reference waveform generating section comprises a first reference waveform generating section for generating a first reference waveform signal having a pulse phase synchronized with a phase timing of the received signal and a second reference waveform generating section for generating a second reference waveform signal having a pulse position and a frequency that are same as those of the detected signal; and
the demodulator selects any one of the first reference waveform signal and the second reference waveform signal in accordance with a current synchronization mode and demodulates the demodulation target signal.

16. The impulse radio communication device of claim 1, wherein
the reference waveform generating section receives input of the received signal and the detected signal and generates the reference waveform signal having a pulse phase synchronized with a phase timing of the received signal, a pulse position of the detected signal, and a frequency of the detected signal.

17. The impulse radio communication device of claim 1, wherein
the demodulator further monitors a synchronization precision of the reference waveform signal with respect to the demodulation target signal, generates an external switching signal for switching the demodulation target signal output by the switching section to the detected signal when the synchronization precision is lower than a predetermined value, and inputs the generated signal to the switching section and the reference waveform generating section respectively as an external control signal.

18. The impulse radio communication device of claim 1, wherein
the wave detector generates any one of a square signal of the received signal and a full-wave rectification signal of the received signal as the detected signal.

* * * * *